June 9, 1925. 1,541,165
S. MINACHE
BUILDING MATERIAL AND PROCESS FOR MANUFACTURING SAME
Filed Aug. 17, 1923
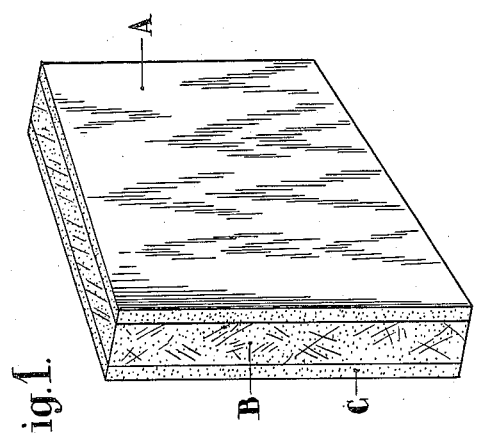
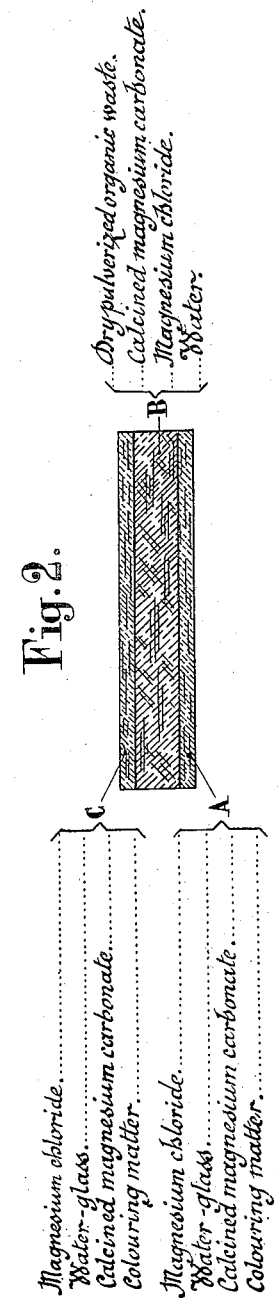
INVENTOR
Sima Minache
BY
Emil Bonnelycke
ATTORNEY Patented June 9, 1925.

1,541,165

UNITED STATES PATENT OFFICE.

SIMA MINACHE, OF CONSTANTINOPLE, TURKEY.

BUILDING MATERIAL AND PROCESS FOR MANUFACTURING SAME.

Application filed August 17, 1923. Serial No. 657,904.

*To all whom it may concern:*

Be it known that I, SIMA MINACHE, a subject of the Shah of Persia, residing at Constantinople, Turkey, have invented certain new and useful Improvements in Building Materials and Processes for Manufacturing Same, of which the following is a specification.

The present invention relates to a new building material and to the process of manufacturing same.

The material, which can be of any dimensions and may take any desired shape or form according to its intended use, essentially consists of three superimposed layers of variable thickness, which together form a slab.

The nature of the invention will be readily understood from the following description in connection with the accompanying drawing.

Referring to the drawing:—

Fig. 1 is a perspective view of a building slab showing the three component layers A, B and C.

Fig. 2 is a labelled cross section of the slab showing the composition of the respective layers.

The first layer consists of a mixture of magnesium chloride, water-glass and calcined magnesium carbonate; this mixture may be coloured if desired.

The second layer consists of a mixture of pulverized organic waste material, calcined magnesium carbonate and magnesium chloride.

The third layer consists of a mixture identical with that forming the first layer. The various substances or materials of which these three mixtures are composed may be used in any suitable proportions.

By way of example for the production of a slab of one square metre superficial area and two centimetres thickness the following method may be used:

A mixture formed of the following substances is first prepared:

Magnesium chloride _____ 2 kilogrammes
Water-glass _____ 10 grammes
Calcined magnesium carbonate ___ 6 kilogrammes
Colouring matter___ad libitum.

This mixture is placed in a pug mill or in any other suitable apparatus and water is added until said mixture attains a pasty consistency. This pasty mass is then poured in a layer of for example, about 3 mm. thickness, into a mould with a movable bottom and sides, said mould having been previously provided with a matrix bearing the ornamentations in intaglio or in relief, which it is desired to impart to the material. A second layer of about 5 cm. thickness is then poured upon the first layer. This second layer consists of the following substances:

Dry pulverized organic waste materials _____ 4 kgs.
Calcined magnesium carbonate _____ 2 kgs.
Magnesium chloride _____ 2 kgs.
Water _____ about 4½ litres.

This second layer is pressed in by hand or by means of a trowel or by any other suitable device, and is thereupon covered by a new layer identical with the first layer in the mould, in such a way that the middle layer which consists mainly of organic waste material and which as previously stated is half dry, is placed between two pasty masses not containing organic material.

The mould is then closed by its cover and placed in a suitable hydraulic press adapted to subject the mass to a pressure of about 50 kilogrammes per square centimetre of interior surface of the mould.

Under the effect of the pressure the cover is pressed into the interior of the mould and compresses the material until its thickness does not exceed 2 centimetres. The cover is thereupon kept in position by any known means and the mould is withdrawn from the press. It is left to stand for about 24 hours, the time required for the mass to consolidate and for drying its constituents. After this period, the slab thus formed is removed from the mould, and placed in a bath containing water of ordinary temperature, in which it is kept for about 12 hours.

On removal from the bath the slab is stored, where it is air-dried at atmospheric temperature for about 30 days, after which time it can be used for building purposes.

The material produced according to the invention is very firm, fire-resistant, water proof and is a bad conductor of heat; it resists atmospheric influences and has a handsome external appearance and its cost of manufacture is relatively low.

Inasmuch as the principal constituents of the material can be found everywhere in large quantities, no difficulty is experienced in producing same. Moreover, inasmuch as the drying is effected only in the air, no expenditure for fuel is required, which is a very important factor from an economic point of view.

As regards the external appearance of the material, it can be given as desired a matt surface, similar to stone, or a polished surface similar to polished marble, in any shade and form.

In this latter case the polishing and the colouring are effected simultaneously with the moulding, and do not increase the cost of manufacture.

One of the most remarkable qualities of the product is its very fine consistency which allows it on moulding, to be ornamented with even very small designs in relief or intaglio.

The material replaces decorative sculpture work on marble or alabaster, terracotta, carved wood and other materials of this kind, the ornamentation depending solely on the matrix employed.

Said material can be sawn as easily as wood, and can be easily nailed and screwed, is very elastic, does not crumble, and does not crack under the influence of shocks.

Its specific gravity is about 1.20.

It has a universal application for the building of houses. It may be utilized for exterior or interior walls, partitions, floors, stairs, ceilings, roofs, doors, panels, stuccos, and the like.

Buildings in which the material of the invention is used, are in principle constructed in such a way that the material need support no load. Preferably a skeleton of reinforced concrete, iron or wood is made which carries all the loads, the wall being coated with two layers of the material of the above described kind.

The decorative effect of the material may be varied to suit individual tastes.

By way of example it may be stated that a house of 5 to 8 rooms can be decorated with the material of the present invention within a week, whilst the services of only six to ten workmen are required.

Having now particularly described and ascertained the nature of my said invention as well as the manner in which the same is to be performed, what I claim as new is:

1. A building element comprising two outer layers each consisting of a mixture of magnesium chloride, water glass and calcined magnesium carbonate, and an intermediate layer consisting of a mixture of pulverized organic waste material, calcined magnesium carbonate and magnesium chloride.

2. A building element, comprising three superimposed layers, the two outer layers each comprising a mixture of 2 kilogrammes magnesium chloride, 10 grammes water glass, and 6 kilogrammes calcined magnesium carbonate, and the intermediate layer comprising a mixture of 4 kilogrammes of dry pulverized organic waste material, 6 kilogrammes calcined magnesium carbonate, and 2 kilogrammes magnesium chloride.

3. The process for the production of building elements which consists in mixing together magnesium chloride, water glass, and calcined magnesium carbonate; adding water to said mixture until a pasty consistency is obtained; pouring said mixture in a layer into a mould; pouring a mixture of dry pulverized organic waste material, calcined magnesium carbonate, magnesium chloride and water into the mould to form a second layer, and pressing said second layer upon said first layer; mixing together magnesium chloride, water glass, and calcined magnesium carbonate, and adding water to said mixture until a pasty consistency is obtained; pouring said mixture in a layer upon said second layer; closing said mould with a cover and applying hydraulic pressure to said mould until the desired thickness of the slab is obtained; fixing said cover in position and keeping the material in said mould at rest for a given period for the purpose of setting and drying the mass; thereupon removing the moulded element from said mould and keeping it under water at atmospheric temperature for a given period, and finally drying the moulded element in the air at ordinary temperature for a given period.

In testimony whereof I affix my signature.

SIMA MINACHE.